United States Patent
Zhang et al.

(10) Patent No.: US 12,450,002 B2
(45) Date of Patent: Oct. 21, 2025

(54) MEMORY MANAGEMENT METHOD AND SYSTEM FOR ANDROID SYSTEM, AND STORAGE MEDIUM

(71) Applicant: BEIJING XIAOMI MOBILE SOFTWARE CO., LTD., Beijing (CN)

(72) Inventors: Cang Zhang, Beijing (CN); Ju Wang, Beijing (CN); Zhihao Zhang, Beijing (CN); Xueni Cheng, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 904 days.

(21) Appl. No.: 17/681,419

(22) Filed: Feb. 25, 2022

(65) Prior Publication Data
US 2023/0037219 A1     Feb. 2, 2023

(30) Foreign Application Priority Data
Jul. 27, 2021   (CN) .......................... 202110852544.0

(51) Int. Cl.
*G06F 12/00*      (2006.01)
*G06F 3/06*      (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0604; G06F 3/0655; G06F 3/0679
USPC .......................................................... 711/154
See application file for complete search history.

(56) References Cited

U.S. PATENT DOCUMENTS

2006/0265438 A1* 11/2006 Shankar ............... G06F 12/0253
2019/0220318 A1* 7/2019 Yang ........................ G06F 9/445

OTHER PUBLICATIONS

European Patent Application No. 22159132.4, Search and Opinion dated Jul. 18, 2022, 21 pages.
Anonymous: "Low Memory Killer Daemon (lmkd) Android Open Source Project" (Sep. 5, 2019), Retrieved from the Internet URL: https://source.android.com/docs/core/perf/lmkd Feb. 27, 2020; 4 pages.

* cited by examiner

*Primary Examiner* — Mohamed M Gebril
(74) *Attorney, Agent, or Firm* — Cozen O'Connor

(57) ABSTRACT

A memory management method and system for an Android system, and a storage medium. The Android system includes a framework layer, a native layer and a kernel layer; the memory management system includes a service component on the framework layer, a memory manager on the native layer and an interface reclaimer on the kernel layer; the service component communicates with the memory manager and the interface reclaimer, respectively; the memory manager is configured to determine a memory event based on pressure stall information (PSI) obtained from a hook on a memory reclaim path, and report the memory event to the service component; and the service component is configured to call the interface reclaimer in response to the memory event being an event of reclaiming memory based on a process, and shut down a corresponding process interface by the interface reclaimer.

16 Claims, 6 Drawing Sheets obtaining, by the memory management module, pressure stall information (PSI) of a hook on a memory reclaim path to determine a memory event, and reporting the memory event to the service module —61 calling by the service module the reclaim interface module in response to the memory event being an event of reclaiming memory based on a process, and shutting down a corresponding process interface by the reclaim interface module —62

FIG. 6

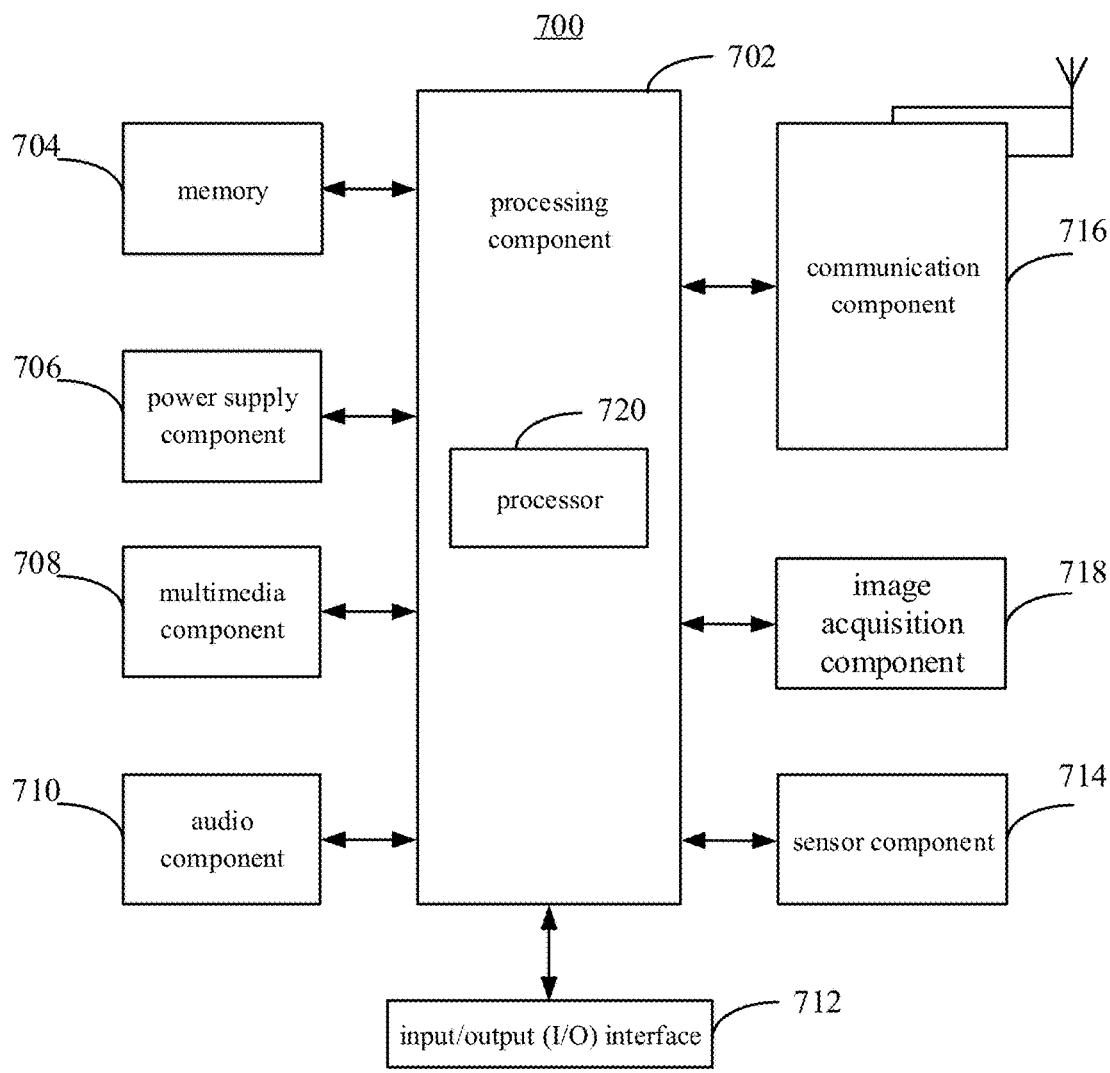

FIG. 7

MEMORY MANAGEMENT METHOD AND SYSTEM FOR ANDROID SYSTEM, AND STORAGE MEDIUM

CROSS-REFERENCE TO RELATED APPLICATIONS

This application is based upon and claims priority to Chinese Patent Application 202110852544.0, filed on Jul. 27, 2021, the entire contents of which are incorporated herein by reference.

TECHNICAL FIELD

The disclosure relates to a field of memory management technology, and particularly to a memory management method and system for an Android system, and a storage medium.

BACKGROUND

At present, a terminal device based on an Android system usually maintains an opened application in the background, so as to quickly start the application next time. However, since the application maintained in the background needs to occupy a certain amount of memory, when too many applications are maintained in the background, a running speed of the terminal device will be slowed down.

In order to improve the running speed of the terminal device, the Android system is provided with a low memory management function (such as Low Memory Killer, also referred to as LM Killer). When the size of the current idle memory is less than a certain threshold, each application is traversed by taking a priority corresponding to the threshold as a reference priority, and a memory size occupied by each application is calculated, to find the application with the priority greater than the reference priority, and the application with the largest priority is killed. However, the above method only kills one application once, resulting in a slow speed of releasing the memory, so that the memory cannot be fully utilized to improve residency, a requirement of the application on the memory cannot be satisfied, and a user experience is reduced.

SUMMARY

The present disclosure provides a memory management method and system for an Android system, and a storage medium, to overcome the shortcoming of the related art.

According to a first aspect of embodiments of the disclosure, a memory management system for an Android system is provided. The Android system includes a framework layer, a native layer and a kernel layer; the memory management system includes a service component on the framework layer, a memory manager on the native layer and an interface reclaimer on the kernel layer; the service component communicates with the memory manager and the interface reclaimer, respectively. The memory manager is configured to determine a memory event based on pressure stall information (PSI) obtained from a hook on a memory reclaim path and report the memory event to the service component; and the service component is configured to call the interface reclaimer in response to the memory event being an event of reclaiming memory based on a process, and shut down a corresponding process interface by the interface reclaimer.

According to a second aspect of embodiments of the disclosure, a memory management method for an Android system is provided, and applied to a memory management system based on an Android system, the Android system includes a framework layer, a native layer and a kernel layer; the memory management system includes a service component on the framework layer, a memory manager on the native layer and an interface reclaimer on the kernel layer; the service component communicates with the memory manager and the interface reclaimer, respectively; the method includes: determine a memory event, by the memory manager, based on pressure stall information (PSI) obtained from a hook on a memory reclaim path, and reporting the memory event to the service component; calling by the service component the interface reclaimer in response to the memory event being an event of reclaiming memory based on a process, and shutting down a corresponding process interface by the interface reclaimer.

According to a third aspect of embodiments of the present disclosure, a non-transitory computer readable storage medium is provided. Any above method may be achieved when an executable computer program in the storage medium is performed by the processor.

It should be noted that, the details above and in the following are exemplary and illustrative, and do not constitute the limitation on the present disclosure.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

FIG. 6 is a flowchart illustrating a memory management method for an Android system according to an embodiment.

FIG. 7 is a block diagram illustrating an electronic device according to an embodiment.

DETAILED DESCRIPTION

The exemplary embodiments will be described in detail here, and examples thereof are shown in the accompanying drawings. When the following descriptions refer to the accompanying drawings, unless otherwise indicated, the same numbers in different drawings represent the same or similar elements. The implementations described in the following exemplary embodiments do not represent all the implementations consistent with the present invention. Rather, they are merely examples of the apparatus and method consistent with some aspects of the present invention as detailed in the appended claims. It should be noted that, the features of the following embodiments or implementations may be combined with each other if there is no conflict.

Figure 1:
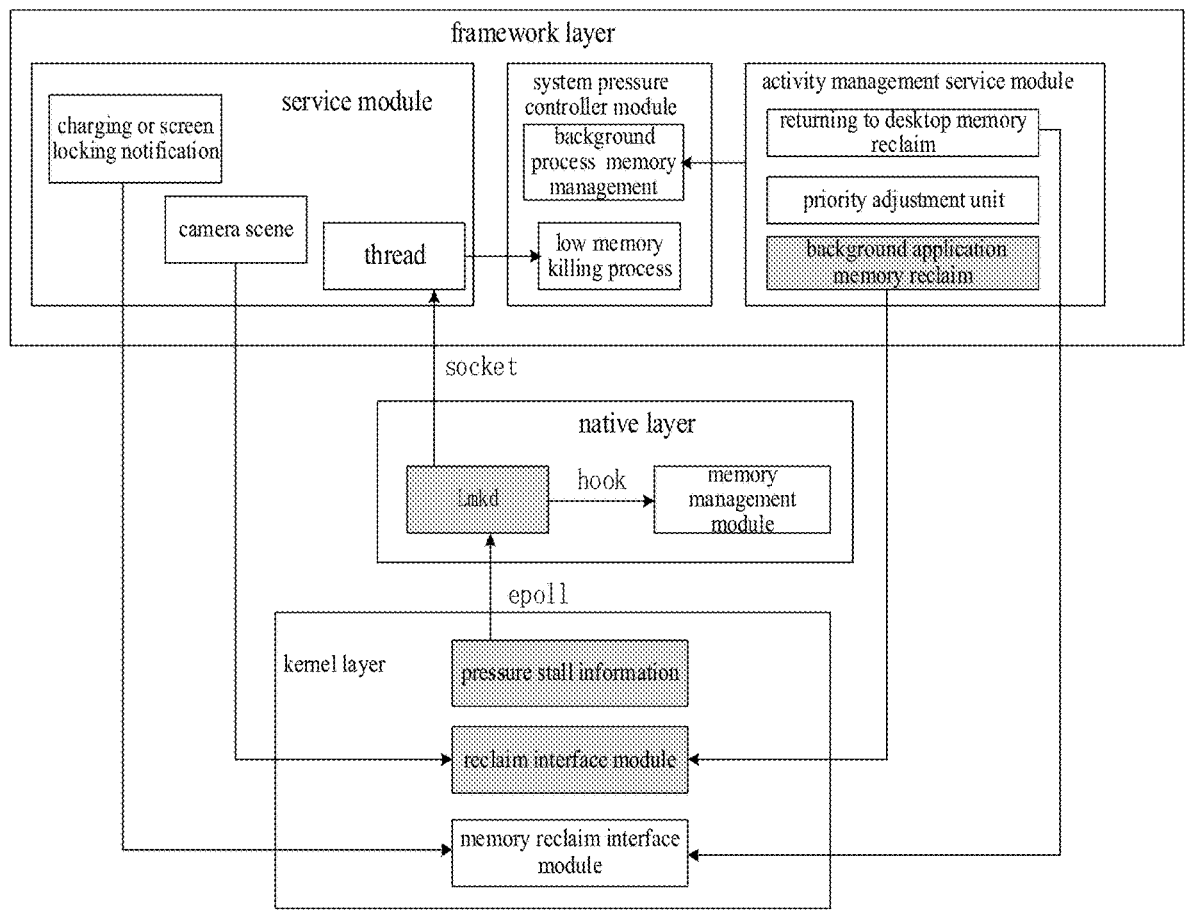
FIG. 1 is a block diagram illustrating a memory management system for an Android system according to an embodiment.

In order to solve the technical problem, the embodiments of the disclosure provide a memory management system for an Android system, which may be applied to an electronic device configured with an Android system, for example, a tablet, a smart phone, a personal computer, a smart television, etc. FIG. 1 is a block diagram illustrating a memory management system for an Android system according to an embodiment. It may be understood that FIG. 1 only illustrates modules and layers of the Android system related with the solution of embodiments of the disclosure, but does not illustrate other modules (or layers) that ensure normal running of the Android system.

As illustrated in FIG. 1, the Android system includes a framework layer, a native layer and a kernel layer (such as Linux Kernel). Based on this, a memory management system includes a service module (such as MiuiMemoryService) arranged on the framework layer, a memory management module (such as Mi memory manager) arranged on the native layer and a reclaim interface module (such as Reclaim) arranged on the kernel layer; the service module communicates with the memory management module and the reclaim interface module, respectively.

The memory management module (such as Mi memory manager) is configured to obtain pressure stall information (PSI) of a hook on a memory reclaim path to determine a memory event, and report the memory event to the service module (such as MiuiMemoryService). The service module (such as MiuiMemoryService) is configured to call the reclaim interface module (such as Reclaim) in response to the memory event being an event of reclaiming memory based on a process, and shut down a corresponding process interface by the reclaim interface module (such as Reclaim). For example, the reclaim interface module (such as Reclaim) may provide a kernel document node/proc/pid/reclaim. The service module may obtain a reclaim event type.

Figure 2:
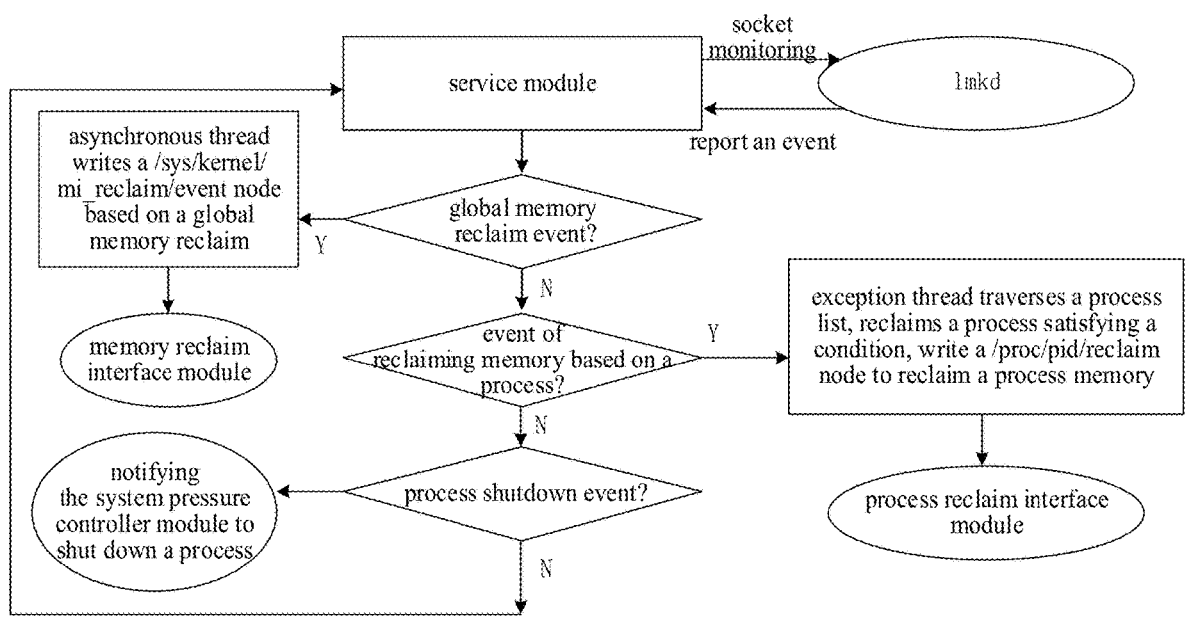
FIG. 2 is a flowchart of obtaining a memory event type according to an embodiment.

FIG. 2 is a flowchart of obtaining a memory event type according to an embodiment. As illustrated in FIG. 2, in response to determining the event is an event of reclaiming memory based on a process, the service module (such as MiuiMemoryService) may call the reclaim interface module (such as Reclaim), that is, write the node in a user mode, and the reclaim interface module (such as Reclaim) may traverse a process, such as virtual memory area (vma), to reclaim memory. In this way, in the embodiment, the PSI on the memory reclaim path may be obtained, a memory pressure situation may be considered from an overall perspective and the process may be shut down actively (also referred to as killing the process), thereby relieving a system memory pressure, which is beneficial to improving system fluency and application residency, thereby providing a better user experience.

In an embodiment, as illustrated in FIG. 1, the native layer includes a low memory killer daemon (Lmkd) configured to monitor a memory pressure event in a pressure stall information (PSI) module, and the Lmkd may obtain a cpu utilization rate in an epoll way, thereby obtaining the PSI. In addition, the Lmkd further may report the PSI to the service module by a socket way. In the embodiment, a hook may be added on the memory reclaim path to obtain a memory pressure at a location where it is, that is, the memory management module (such as Mi memory manager) may obtain the PSI of the memory reclaim path by the hook, and determine the memory event based on the PSI.

Figure 3:
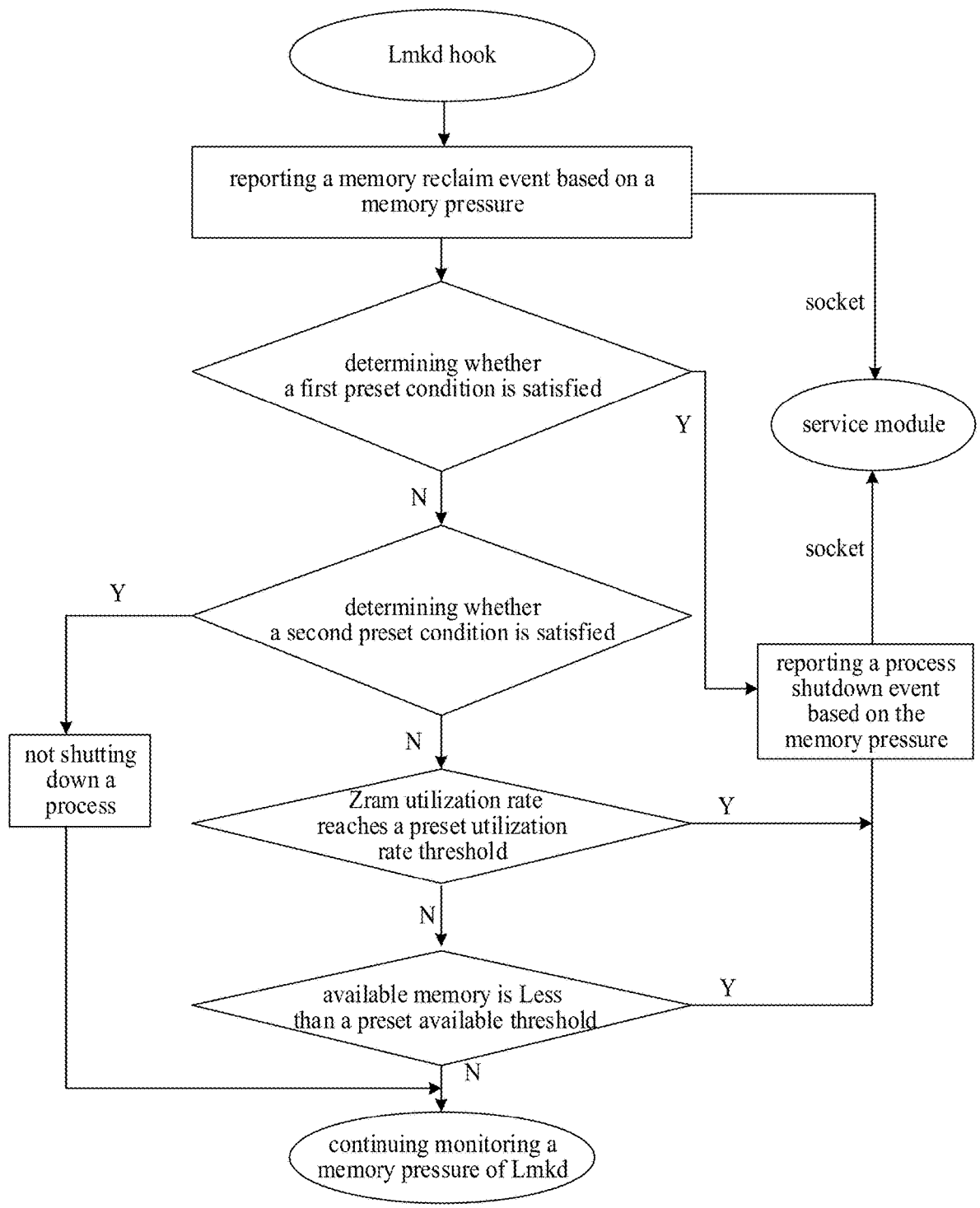
FIG. 3 is a flowchart of obtaining a memory pressure event according to an embodiment.

FIG. 3 is a flowchart of obtaining a memory pressure event according to an embodiment.

As illustrated in FIG. 3, obtaining a memory pressure event may include the following:

(1) A memory reclaim event is reported based on the memory pressure. For example, pressure levels are classified based on the memory pressure, for example, a low memory pressure level, a medium memory pressure level, an emergency memory pressure level, etc., and the number and the value range of the pressure level may be determined based on a specific scene, which is not limited herein. It may be understood that different memory pressures correspond to different memory reclaim event levels, therefore, the higher the memory reclaim event level is, the higher the reclaim level; or, when a memory is required to be reclaimed, an application or a thread corresponding to the event with a higher memory reclaim event level is shut down first.

(2) It is determined whether a first preset condition is satisfied, the first preset condition including at least one of: the number of consecutive occurrences of an object which currently uses a memory adopting a direct reclaim exceeding a preset number threshold, a medium memory pressure exceeding a preset medium pressure threshold for a predetermined time period and a waterline of a kernel thread (such as kswapd) being lower than a predetermined waterline. In response to satisfying the first preset condition, a process shutdown event is reported based on the memory pressure. The above object refers to an application or a system process.

(3) In response to not satisfying the first preset condition, it continues to be determined whether a second preset condition is satisfied, the second preset condition indicates that a memory pressure level is less than the emergency memory pressure level, the kernel thread (such as kswapd) and a direct reclaim rate are normal (i.e., the kernel thread has no exception and the direct reclaim rate exceeds a predetermined rate), and a file page fluctuation is less than a preset fluctuation threshold and there is no memory compaction on the memory reclaim path.

In response to satisfying the second preset condition, a memory reclaim path pressure continues to be monitored.

(4) In response to not satisfying the second preset condition, it continues to be determined whether a memory compression (such as zRAM) utilization rate reaches a preset utilization rate threshold. In response to the utilization rate reaching the preset utilization rate threshold, the process shutdown event is reported based on the memory pressure.

(5) In response to the utilization rate not reaching the preset utilization rate threshold, it is determined whether an available memory is less than a preset available threshold. In response to the available memory being less than the preset available threshold, the process shutdown event is reported based on the memory pressure, and in response to the available memory exceeding the preset available threshold, the memory reclaim path pressure continues to be monitored.

In the embodiments, by configuring the memory management module (such as Mi memory manager), a memory reclaim event and a process shutdown event may be generated based on the PSI, and reported to the service module (such as MiuiMemoryService), to achieve the effect of actively managing a system memory.

In an embodiment, as illustrated in FIG. 1, the kernel layer further includes a memory reclaim interface module (such as Mi memory reclaim). The memory reclaim interface module (such as Mi memory reclaim) communicates with the service module (such as MiuiMemoryService). The service module (such as MiuiMemoryService) is further configured to call the memory reclaim interface module (such as Mi memory reclaim) in response to receiving a charging signal and/or a screen locking signal, and provide by the memory reclaim interface module (such as Mi memory reclaim) an active reclaim for anonymous page memory of a process in a user mode. For example, the memory reclaim interface module (such as Mi memory reclaim) may provide a kernel document node/sys/kernel/mi_reclaim/event, when the service module (such as MiuiMemoryService) calls the memory reclaim interface module (such as Mi memory reclaim), that is, write the node in a user mode, a reclaim thread in the memory reclaim interface module (such as Mi memory reclaim) may call a global memory reclaim interface provided by an Android system kernel to reclaim the memory.

In an embodiment, the service module (such as MiuiMemoryService) further may stop calling the memory reclaim interface module (such as Mi memory reclaim) in response to receiving a power disconnection signal and/or a screen lightening signal, so that the memory reclaim may be stopped.

In this way, in the embodiments, by configuring the memory reclaim interface module (such as Mi memory reclaim), the memory may be globally reclaimed in some preset scenes, for example, in a charging scene or a screen locking scene, to achieve the effect of actively managing a system memory and relieve a system memory pressure, which is beneficial to improving system fluency and application residency, thereby providing a better user experience.

In an embodiment, as illustrated in FIG. 1, the framework layer further includes a system pressure controller module (such as SystemPressureController). The system pressure controller module (such as SystemPressureController) may communicate with the service module (such as MiuiMemoryService). The service module (such as MiuiMemoryService) is further configured to send a first notification message to the system pressure controller module (such as SystemPressureController) in response to the memory event being the process shutdown event. The system pressure controller module (such as SystemPressureController) is configured to shut down a process based on an active degree of the process in response to first notification message.

Figure 4:
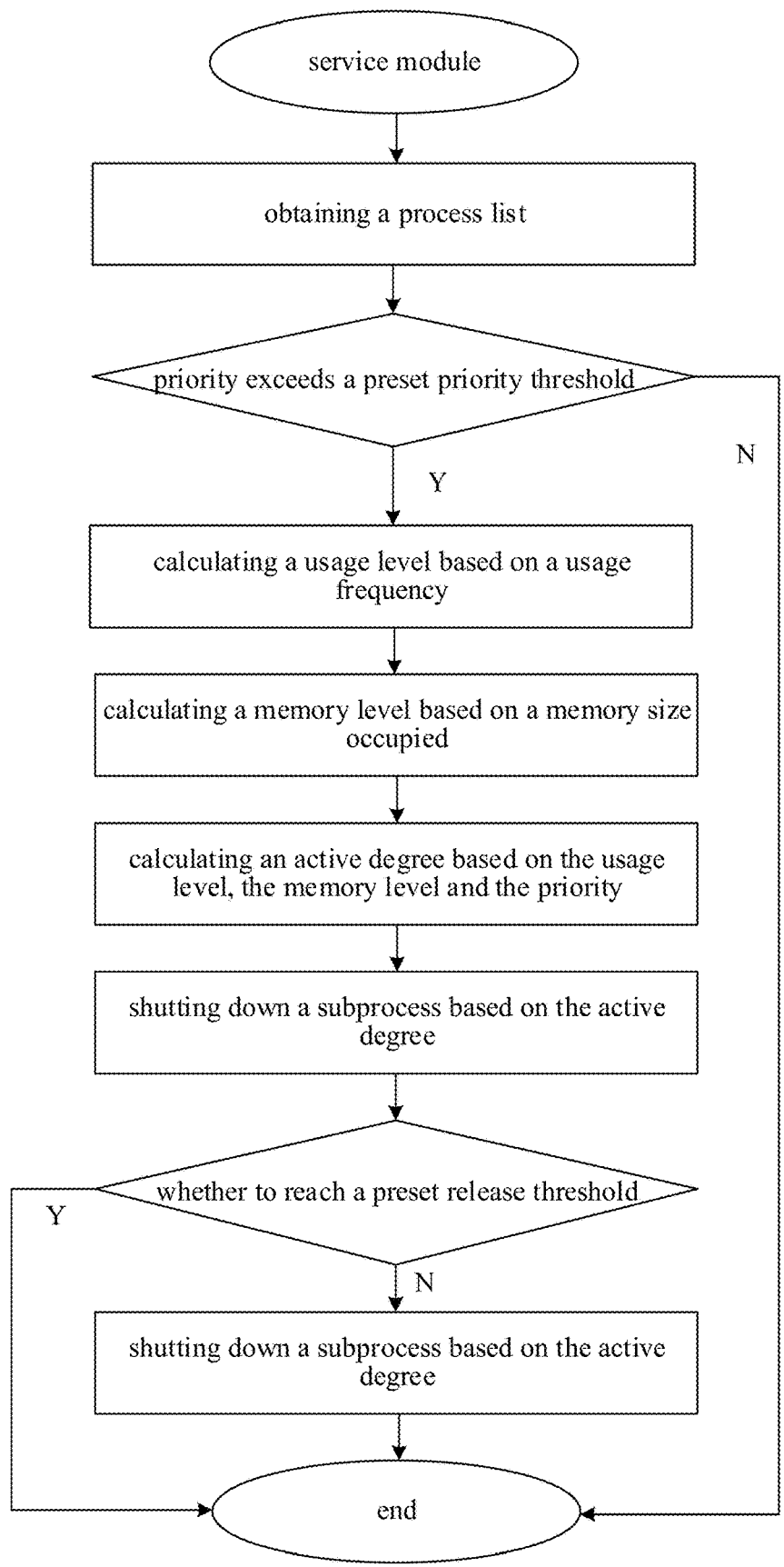
FIG. 4 is a flowchart of shutting down a subprocess according to an embodiment.

FIG. 4 is a flowchart of shutting down a subprocess according to an embodiment. As illustrated in FIG. 4, the system pressure controller module (such as SystemPressureController) is configured to shut down the process based on the active degree of the process in response to the first notification message as follows.

(1) In response to receiving the first notification message, a priority (Adj) of each process in a process list is obtained.

(2) In response to the priority of each process exceeding a preset priority threshold (for example, the value is 200), a usage level is calculated based on a usage frequency of each application. An application may correspond to one or more processes. The usage frequency may be obtained based on a historical usage record of each application, for example, the usage number of times of each application in one month, one week or one day. Based on a preset corresponding relationship between the number of times and the usage level, the usage level of each application may be calculated. And a memory level may be calculated based on a memory size occupied by each application. For example, based on a preset corresponding relationship between the memory size and the memory level, after the memory size occupied by each application is determined, the memory level may be determined based on the above corresponding relationship.

(3) The active degree is calculated based on the usage level, the memory level and the priority of each application. For example, the usage level may be multiplied by a corresponding weight, the memory level may be multiplied by a corresponding weight, and the priority may be multiplied by a corresponding weight, and then the obtained products are summed to obtain a sum value as the active degree of the application.

(4) Starting from a subprocess with the highest active degree of the application with the highest active degree, the subprocess is shut down until a memory size released by shutting down the subprocess exceeds a preset release threshold (for example, 50 MB). Please note that, the active degree of the subprocess of the application may be calculated using any existing method.

In this way, in the embodiment, by setting the system pressure controller module (such as SystemPressureController), the occupied memory may be released based on the active degree, to achieve the effect of actively managing a system memory, which is beneficial to improving system fluency and application residency, thereby providing a better user experience.

In an embodiment, as illustrated in FIG. 1, the framework layer further includes an activity management service module (such as ActivityManagerService, i,e., AMS). The activity management service module (such as ActivityManagerService, i,e., AMS) may communicate with the reclaim interface module (such as Reclaim) in the kernel layer. The activity management service module (such as ActivityManagerService, i,e., AMS) is configured to call the reclaim interface module (such as Reclaim) in response to detecting that an application is moved to a background, and shut down a corresponding process interface by the reclaim interface module, that is, the memory occupied by an anonymous page may be reclaimed based on the process, so as achieve an effect of releasing the memory occupied by the anonymous page, which is beneficial to improving system fluency and application residency.

In an embodiment, as illustrated in FIG. 1, the activity management service module (such as ActivityManagerService, i,e., AMS) further may communicate with the memory reclaim interface module (such as Mi memory reclaim) in the kernel layer. The activity management service module (such as ActivityManagerService, i,e., AMS) is configured to call the memory reclaim interface module (such as Mi memory reclaim) in response to detecting switching from the application to a desktop, and provide by the memory reclaim interface module (such as Mi memory reclaim) an active reclaim for anonymous page memory of a process in a user mode. The working principle of the memory reclaim interface module has been described in the above embodiments, which will not be repeated here.

In an embodiment, as illustrated in FIG. 1, the activity management service module (such as ActivityManagerService, i,e., AMS) further may communicate with the system pressure controller module (such as SystemPressureController) in the framework layer. The activity management service module (such as ActivityManagerService, i,e., AMS) may send a second notification message to the system pressure controller module (such as SystemPressureController) in response to detecting that a target application currently running is moved to the background. The system pressure controller module (such as SystemPressureController) may shut down a target application occupying a memory exceeding a preset occupancy threshold in response to receiving the second notification message.

Figure 5:
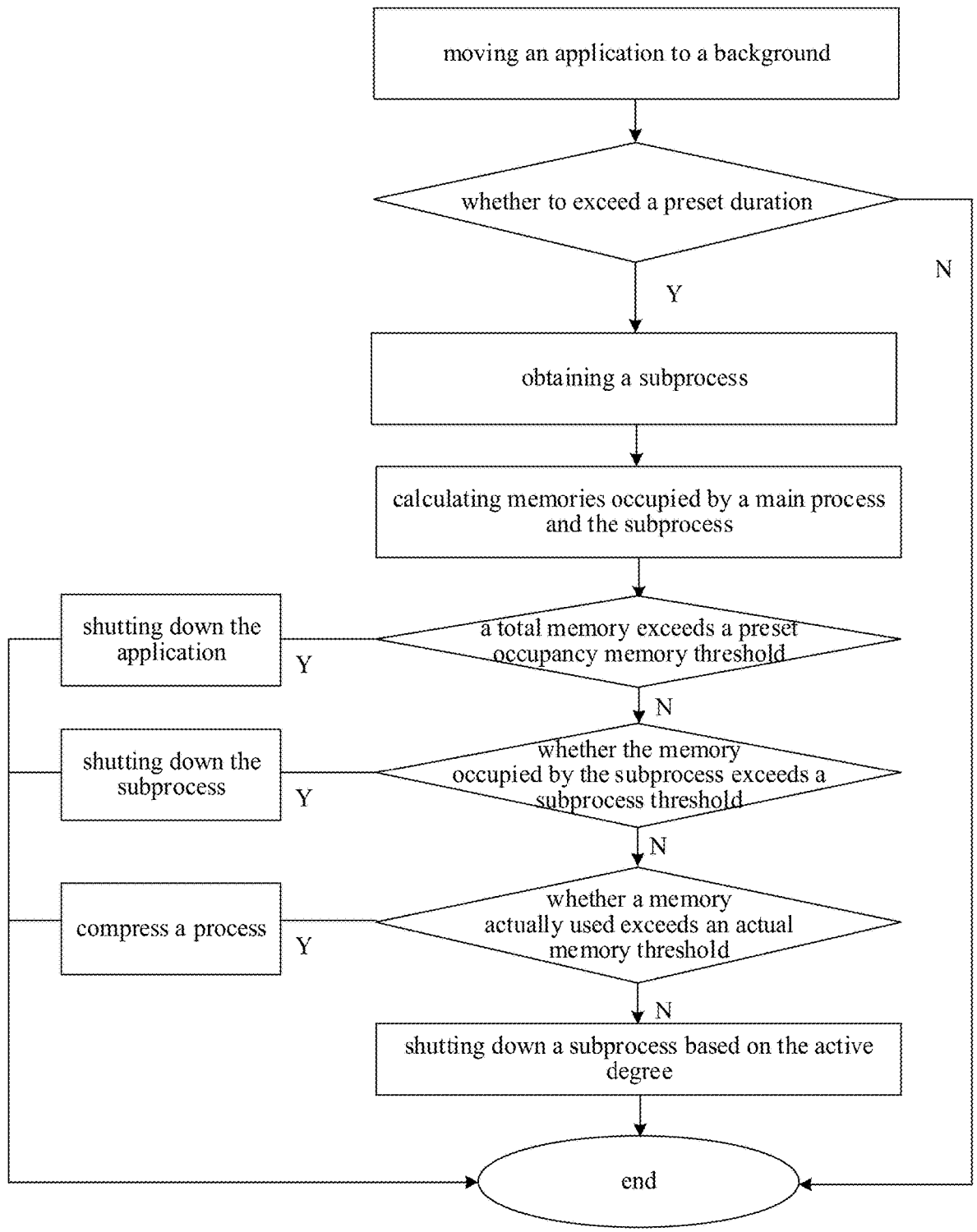
FIG. 5 is a flowchart of shutting down a memory based on an active degree according to an embodiment.

FIG. 5 is a flowchart of shutting down a memory based on an active degree according to an embodiment. As illustrated in FIG. 5, the system pressure controller module (such as SystemPressureController) may shut down the target application occupying the memory exceeding the preset occupancy threshold in response to receiving the second notification message as follows.

In response to receiving the second notification message, a duration of moving the target application to the background is obtained. In response to the duration exceeding a preset duration (for example, 5 s), a subprocess of the target application is obtained. Memories occupied by the subprocess and a main process of the target application are calculated respectively. If a total memory occupied by the target application exceeds a preset occupancy memory threshold, the target application is shut down, otherwise, it is determined whether the memory occupied by the subprocess of the target application exceeds a subprocess threshold. In response to exceeding the subprocess threshold, the subprocess of the target application is shut down, and in response to not exceeding the subprocess threshold, it is determined whether a memory actually used by the target application exceeds an actual memory threshold. In response to exceeding the actual memory threshold, the process is compressed, and in response to not exceeding the actual memory threshold, the procedure is ended.

In this way, in the embodiment, by setting the system pressure controller module (such as SystemPressureController), a target application moved to the background and occupying a relatively large memory may be shut down to release the occupied memory, to achieve the effect of actively managing a system memory, which is beneficial to improving system fluency and application residency, thereby providing a better user experience.

In an embodiment, as illustrated in FIG. 1, the activity management service module (such as ActivityManagerService, i,e., AMS) further includes a priority adjustment unit (such as MiProcessOomAdjuster). The priority adjustment unit (such as MiProcessOomAdjuster unit) is configured to adjust a priority of a current application satisfying a third preset condition, the current application includes an application that needs a specified application to be moved to a foreground in response to calling the specified application, and the third preset condition indicates moving to the background in response to calling the specified application. The above specified application may include but be not limited to a camera application, a voice application, and an album application. In this way, in the embodiment, when the current application is moved to the background and the specified application is moved to the foreground while the current application calls the specified application, although the priority of the current application may be reduced based on an existing strategy later, the priority adjustment unit may further adjust the priority when the priority is reduced to a target priority, for example, restore the original priority and maintain for a period of time (for example, 2 min), so as to ensure that the current application may not be shut down, thus improving a user experience.

On the basis of the above memory management system, the embodiments of the disclosure further provide a memory management method for an Android system applied to a memory management system based on an Android system. The Android system includes a framework layer, a native layer and a kernel layer (such as Linux Kernel); the memory management system includes a service module (such as MiuiMemoryService) arranged on the framework layer, a memory management module (such as Mi memory manager) arranged on the native layer and a reclaim interface module (such as Reclaim) arranged on the kernel layer. The service module (such as MiuiMemoryService) communicates with the memory management module (such as Mi memory manager) and the reclaim interface module (such as Reclaim).

FIG. 6 is a flowchart illustrating a memory management method for an Android system according to an embodiment. The method of FIG. 6, includes the following:

At block 61, the memory management module (such as Mi memory manager) obtains pressure stall information (PSI) of a hook on a memory reclaim path to determine a memory event, and reports the memory event to the service module (such as MiuiMemoryService);

At block 62, the service module (such as MiuiMemoryService) calls the reclaim interface module (such as Reclaim) in response to the memory event being an event of reclaiming memory based on a process, and shuts down a corresponding process interface by the reclaim interface module.

In an embodiment, the memory management module (such as Mi memory manager) obtains the PSI of the hook on the memory reclaim path to determine the memory event as follows. A memory reclaim event is reported based on a memory pressure; it is determined whether a first preset condition is satisfied. In response to satisfying the first preset condition, a process shutdown event is reported based on the memory pressure. The first preset condition includes at least one of: the number of consecutive occurrences of an object currently using a memory adopting a direct reclaim exceeding a preset number threshold, a medium memory pressure of the object exceeding a preset medium pressure threshold for a predetermined time period and a continuous waterline of a kernel thread (such as kswapd) being lower than a predetermined waterline. In response to not satisfying the first preset condition, it is determined whether a second preset condition is satisfied. In response to satisfying the second preset condition, a memory reclaim path pressure continues to be monitored. The second preset condition indicates that a memory pressure level is less than an emergency memory pressure level, the kernel thread (such as kswapd) and a direct reclaim rate are normal, and a file page fluctuation is less than a preset fluctuation threshold and there is no memory compaction on the memory reclaim path. In response to not satisfying the second preset condition, it is determined whether a memory compression (zRAM) utilization rate reaches a preset utilization rate threshold. In response to reaching the preset utilization rate threshold, the process shutdown event is reported based on the memory pressure. In response to not reaching the preset utilization rate threshold, it is determined whether an available memory is less than a preset available threshold. In response to the available memory being less than the preset available threshold, the process shutdown event is reported based on the memory pressure, and in response to the available memory exceeding the preset available threshold, the memory reclaim path pressure continues to be monitored.

In an embodiment, the kernel layer further includes a memory reclaim interface module (such as Mi memory reclaim); the memory reclaim interface module (such as Mi memory reclaim) communicates with the service module (such as MiuiMemoryService); the method further includes: the service module (such as MiuiMemoryService) calling the memory reclaim interface module (such as Mi memory reclaim) in response to receiving a charging signal and/or a screen locking signal, and providing by the memory reclaim interface module (such as Mi memory reclaim) an active reclaim for anonymous page memory of a process in a user mode.

In an embodiment, the method further includes: the service module (such as MiuiMemoryService) stopping calling the memory reclaim interface module (such as Mi memory reclaim) to stop the memory reclaim in response to receiving a power disconnection signal and/or a screen lightening signal.

In an embodiment, the framework layer further includes a system pressure controller module (such as SystemPressureController); the system pressure controller module (such as SystemPressureController) communicates the service module (such as MiuiMemoryService); the method further includes: the service module (such as MiuiMemoryService) sending a first notification message to the system pressure controller module (such as SystemPressureController) in response to the memory event being the process shutdown event;

and the system pressure controller module (such as SystemPressureController) shutting down a process based on an active degree of the process in response to the first notification message.

In an embodiment, the system pressure controller module (such as SystemPressureController) shuts down the process based on the active degree of the process in response to the first notification message as follows. In response to receiving the first notification message, a priority of each process in a process list is obtained. In response to the priority of each process exceeding a preset priority threshold, a usage level is calculated based on a usage frequency of each application, and a memory level is calculated based on a memory size occupied by each application. The active degree is calculated based on the usage level, the memory level and the priority of each application. Starting from a subprocess with the highest active degree, a subprocess is shut down until a memory size released by shutting down the subprocess exceeds a preset release threshold.

In an embodiment, the framework layer further includes an activity management service module (such as ActivityManagerService, AMS); the activity management service module (such as ActivityManagerService, AMS) communicates with the reclaim interface module (such as Reclaim); the method further includes: the activity management service module (such as ActivityManagerService, AMS) calling the reclaim interface (such as Reclaim) in response to detecting that an application is moved to a background, and shutting down a corresponding process interface by the reclaim interface module.

In an embodiment, the activity management service module (such as ActivityManagerService, AMS) further communicates with the memory reclaim interface module (such as Mi memory reclaim) in the kernel layer; the method further includes: the activity management service module (such as ActivityManagerService, AMS) calling the memory reclaim interface module (such as Mi memory reclaim) in response to detecting switching from the application to a desktop, and providing by the memory reclaim interface module (such as Mi memory reclaim) an active reclaim for anonymous page memory of a process in a user mode.

In an embodiment, the activity management service module (such as ActivityManagerService, AMS) further communicates with the system pressure controller module (such as SystemPressureController) in the framework layer; the method further includes: the activity management service module (such as ActivityManagerService, i,e., AMS) sending a second notification message to the system pressure controller module (such as SystemPressureController) in response to detecting that a target application currently running is moved to the background; and the system pressure controller module (such as SystemPressureController) shutting down a target application occupying a memory exceeding a preset occupancy threshold in response to receiving the second notification message.

In an embodiment, the system pressure controller module (such as SystemPressureController) is configured to shut down the target application occupying the memory exceeding the preset occupancy threshold in response to receiving the second notification message as follows. In response to receiving the second notification message, a duration of moving the target application to the background is obtained. In response to the duration exceeding a preset duration, a subprocess of the target application is obtained. Memories occupied by the subprocess and a main process of the target application are calculated respectively. In response to a total memory occupied by the application exceeding a preset occupancy memory threshold, the target application is shut down; otherwise, it is determined whether the memory occupied by the subprocess of the target application exceeds a subprocess threshold. In response to exceeding the subprocess threshold, the subprocess of the target application is shut down, and in response to not exceeding the subprocess threshold, it is determined whether a memory actually used by the application exceeds an actual memory threshold. In response to exceeding the actual memory threshold, the process is compressed, and in response to not exceeding the actual memory threshold, the process is ended.

In an embodiment, the activity management service module (such as ActivityManagerService, i,e., AMS) further includes a priority adjustment unit (such as MiProcessOomAdjuster); the method further includes: the priority adjustment unit (such as MiProcessOomAdjuster) adjusting a priority of a current application satisfying a third preset condition, the current application including an application that needs a specified application to be moved to a foreground in response to calling the specified application, and the third preset condition indicating moving to the background in response to calling the specified application.

It needs to be noted that, the method as illustrated in the embodiment matches the content of the system embodiment as illustrated in FIG. 1, which may refer to the content of the above system embodiment, which will not be repeated here.

FIG. 7 is a block diagram illustrating an electronic device according to an embodiment. For example, an electronic device 700 may be a smart phone, a computer, a digital broadcasting terminal, a tablet device, a medical equipment, a fitness equipment, a personal digital assistant, etc.

As illustrated in FIG. 7, the electronic device 700 may include one or more components: a processing component 702, a memory 704, a power supply component 706, a multimedia component 708, an audio component 710, an input/output (I/O) interface 712, a sensor component 714, a communication component 716, an image collection component 718 and a housing.

The processing component 702 generally controls the overall operation of the electronic device 700, such as the operations related to display, phone call, data communication, camera operation and record operation. The processing component 702 may include one or more processors 720 to perform a computer program. In addition, the processing component 702 may include one or more modules for the convenience of interaction between the processing component 702 and other components. For example, the processing component 702 may include a multimedia module for the convenience of interaction between the multimedia component 708 and the processing component 702.

The memory 704 is configured to store all types of data to support the operation of the electronic device 700. Examples of the data include computer programs of any applications or methods operated on the electronic device 700, contact data, phone book data, messages, pictures, videos, etc. The memory 704 may be implemented by any type of transitory or non-transitory storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 706 may provide power for all components of the electronic device 700. The power supply component 706 may include a power supply management system, one or more power supplies, and other units related to generating, managing and distributing power for the electronic device 700. The power supply component 706 may include a power supply chip, and the controller may communicate with a power supply chip, thereby controlling the power supply chip to conduct or disconnect a switch element, so that a battery supplies power or does not supply power to a main board circuit.

The multimedia component 708 includes a screen (or display) of an output interface provided between the electronic device 700 and a target object. In some embodiments, a screen may include a liquid crystal display (LCD) and a touch panel (TP). If a screen includes a touch panel, the screen may be achieved as a touch screen to receive input information from the target object. The touch panel includes one or more touch sensors to sense touch, slide and gestures on the touch panel. The touch sensor may not only sense the boundary of touch or slide action, but also detect the duration and pressure related to the touch or slide operation.

The audio component 710 is configured to output and/or input audio file information. For example, the audio component 710 includes a microphone (MIC). When the electronic device 700 is in operation mode, such as a call mode, a record mode, and a voice recognition mode, the microphone is configured to receive external audio file information. The audio file information received may be further stored in the memory 704 or sent via the communication component 716. In some embodiments, the audio component 710 further includes a speaker configured to output audio file information.

The I/O interface 712 provides an interface for the processing component 702 and a peripheral interface module, and the peripheral interface module may be a keyboard, a click wheel, a button, etc.

The sensor component 714 includes one or more sensors, configured to provide various aspects of status assessments for the electronic device 700. For example, the sensor component 714 may detect the on/off state of the electronic device 700 and the relative positioning of the component, for example, the component is a display screen and a keypad of the electronic device 700. The sensor component 714 further may detect the position change of the electronic device 700 or one component of the electronic device 700, the presence or absence of contact between the target object and the device 700, the orientation or acceleration/deceleration of the device 700, and the temperature change of the device 1300. In the example, the sensor component 714 may include a magnetic sensor, a gyroscope, and a magnetic field sensor, the magnetic field sensor includes at least one of the following: a Hall sensor, a thin film magnetoresistive sensor, and a magnetic liquid acceleration sensor.

The communication component 716 is configured for the convenience of wired or wireless communication between the electronic device 700 and other devices. The electronic device 700 may access a wireless network based on a communication standard, such as WiFi, 2G, 3G, 4G, 5G, or their combination. In an exemplary embodiment, the communication component 716 receives broadcast information or broadcast-related information from an external broadcast management system via a broadcast channel. In an exemplary embodiment, the communication component 716 further includes a near field communication (NFC) module to facilitate short-range communication. For example, an NFC module may be achieved based on a radio frequency identification (RFID) technology, an infrared data association (IRDA) technology, an ultra-wideband (UWB) technology, a bluetooth (BT) technology and other technologies.

In an embodiment, the electronic device 700 may be achieved by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronics components.

In an embodiment, a non-transitory computer readable storage medium including an executable computer program is further provided, such as a memory 704 including instructions, the executable computer program may be performed by a processor. The computer readable storage medium may be a ROM, a random access memory (RAM), a CD-ROM, a magnetic tape, a floppy disk, an optical data storage device, etc.

After considering the specification and practicing the disclosure herein, those skilled in the art will easily think of other embodiments of the present application. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A memory management system for an operating system, wherein, the operating system comprises a framework layer, a native layer and a kernel layer; the memory management system comprises a service component on the framework layer, a memory manager on the native layer and an interface reclaimer on the kernel layer; the service component communicates with the memory manager and the interface reclaimer, respectively;

wherein, the memory manager is configured to determine a memory event based on pressure stall information (PSI) obtained from a hook on a memory reclaim path, and report the memory event to the service component; and the service component is configured to call the interface reclaimer in response to the memory event being an event of reclaiming memory based on a process and shut down a corresponding process interface by the interface reclaimer;

wherein, the framework layer further comprises an activity management service component; the activity management service component communicates with the interface reclaimer;

the activity management service component is configured to call the interface reclaimer in response to detecting that an application is moved to a background and shut down the corresponding process interface by the interface reclaimer;

wherein, the activity management service component further communicates with the memory reclaimer in the kernel layer;

the activity management service component is configured to call the memory reclaimer in response to detecting switching from the application to a desktop and provide by the memory reclaimer an active reclaim for anonymous page memory of a process in a user mode.

2. The system of claim 1, wherein, the memory manager is configured to determine the memory event based on the PSI obtained from the hook on the memory reclaim path and report the memory event to the service component by:

reporting, based on a memory pressure, the event of reclaiming memory;

determining whether a first preset condition is satisfied, wherein the first preset condition comprises at least one of: a number of consecutive occurrences of an object which currently uses a memory adopting a direct reclaim exceeding a preset number threshold, a medium memory pressure of the object exceeding a preset medium pressure threshold for a predetermined time period and a waterline of a kernel thread being lower than a predetermined waterline;

reporting a process shutdown event based on the memory pressure in response to satisfying the first preset condition;

determining whether a second preset condition is satisfied in response to not satisfying the first preset condition, wherein the second preset condition indicates that the memory pressure level is smaller than an emergency memory pressure level, the kernel thread has no exception and a direct reclaim rate exceeds a predetermined rate, a file page fluctuation is less than a preset fluctuation threshold and there is no memory compaction on the memory reclaim path;

continuing monitoring the memory pressure on the memory reclaim path in response to satisfying the second preset condition;

determining whether a memory compression utilization rate reaches a preset utilization rate threshold in response to not satisfying the second preset condition;

reporting the process shutdown event based on the memory pressure in response to the memory compression utilization rate reaching the preset utilization rate threshold;

determining whether an available memory is less than a preset available threshold in response to the memory compression utilization rate not reaching the preset utilization rate threshold;

reporting the process shutdown event based on the memory pressure in response to the available memory being less than the preset available threshold, and continuing monitoring the memory pressure on the memory reclaim path in response to the available memory exceeding the preset available threshold.

3. The system of claim 1, wherein, the kernel layer further comprises a memory reclaimer; the memory reclaimer communicates with the service component; and the service component is further configured to call the memory reclaimer in response to receiving at least one of (a) a charging signal and (b) a screen locking signal, and provide by the memory reclaimer an active reclaim for anonymous page memory of a process in a user mode.

4. The system of claim 3, wherein, the service component is further configured to stop calling the memory reclaimer to stop the active reclaim in response to receiving at least one of (i) a power disconnection signal and (ii) a screen lightening signal.

5. The system of claim 1, wherein the framework layer further comprises a system pressure controller; the system pressure controller communicates with the service component;

the service component is further configured to send a first notification message to the system pressure controller in response to the memory event being a process shutdown event; and the system pressure controller is configured to shut down a process based on an active degree of the process in response to the first notification message.

6. The system of claim 5, wherein, the system pressure controller is configured to shut down the process based on the active degree of the process in response to the first notification message by:

in response to receiving the first notification message, obtaining a priority of each process in a process list;

in response to the priority of each process exceeding a preset priority threshold, calculating a usage level based on a usage frequency of each application, and calculating a memory level based on a memory size occupied by each application;

calculating the active degree of each application based on the usage level, the memory level and the priority of each application; and shutting down a subprocess starting from the subprocess with the highest active degree, until a memory size released by shutting down the subprocess exceeds a preset release threshold.

7. The system of claim 1, wherein, the activity management service component further communicates with a system pressure controller in the framework layer;

the activity management service component is configured to send a second notification message to the system pressure controller in response to detecting that a target application currently running is moved to the background; and the system pressure controller is configured to shut down the target application occupying a memory exceeding a preset occupancy threshold in response to receiving the second notification message.

8. The system of claim 7, wherein, the system pressure controller is configured to shut down the target application occupying the memory exceeding the preset occupancy threshold in response to receiving the second notification message by:

in response to receiving the second notification message, obtaining a duration of moving the target application to the background;

in response to the duration exceeding a preset duration, obtaining a subprocess of the target application;

calculating memories occupied by the subprocess and a main process of the target application respectively;

in response to a total memory occupied by the target application exceeding a preset occupancy memory threshold, shutting down the target application;

in response to the total memory not exceeding the preset occupancy memory threshold, determining whether the memory occupied by the subprocess of the target application exceeds a subprocess threshold;

shutting down the subprocess of the target application in response to the memory occupied by the subprocess exceeding the subprocess threshold, and determining whether a memory actually used by the target application exceeds an actual memory threshold in response to the memory occupied by the subprocess not exceeding the subprocess threshold; and performing a process compression in response to the memory actually used by the target application exceeding the actual memory threshold.

9. The system of claim 1, wherein, the activity management service component further comprises a priority adjuster; the priority adjuster is configured to adjust a priority of a current application satisfying a third preset condition, wherein the current application includes an application that needs a specified application to be moved to a foreground in response to calling the specified application, and the third preset condition indicates moving to the background in response to calling the specified application.

10. A memory management method for an operating system, applied to a memory management system based on an operating system, the operating system comprises a framework layer, a native layer and a kernel layer; the memory management system comprises a service component on the framework layer, a memory manager on the native layer and an interface reclaimer on the kernel layer; the service component communicates with the memory manager and the interface reclaimer, respectively; the method comprises:

determining a memory event, by the memory manager, based on pressure stall information (PSI) obtained from a hook on a memory reclaim path, and reporting the memory event to the service component; and calling by the service component the interface reclaimer in response to the memory event being an event of reclaiming memory based on a process, and shutting down a corresponding process interface by the interface reclaimer;

wherein, the framework layer further comprises an activity management service component; the activity management service module communicates with the interface reclaimer; the method further comprises:

calling by the activity management service component the interface reclaimer in response to detecting that an application is moved to a background, and shutting down the corresponding process interface by the interface reclaimer;

wherein, the activity management service component further communicates with the memory reclaimer in the kernel layer; the method further comprises:

calling by the activity management component module the memory reclaimer in response to detecting switching from the application to a desktop and providing by the memory reclaimer an active reclaim for anonymous page memory of a process in a user mode.

11. The method of claim 10, wherein, determining the memory event by the memory manager the PSI obtained from the hook on the memory reclaim path and reporting the memory event to the service component, comprising:

reporting, based on a memory pressure, the event of reclaiming memory;

determining whether a first preset condition is satisfied, wherein the first preset condition comprises at least one of: a number of consecutive occurrences of an object which currently uses a memory adopting a direct reclaim exceeding a preset number threshold, a medium memory pressure of the object exceeding a medium memory pressure level for a predetermined time period and a waterline of a kernel thread being lower than a predetermined waterline;

reporting a process shutdown event based on the memory pressure in response to satisfying the first preset condition;

determining whether a second preset condition is satisfied in response to not satisfying the first preset condition, wherein the second preset condition indicates that the memory pressure level is smaller than an emergency memory pressure level, the kernel thread has no exception and a direct reclaim rate exceeds a predetermined rate, a file page fluctuation is less than a preset fluctuation threshold and there is no memory compaction on the memory reclaim path;

continuing monitoring the memory pressure on the memory reclaim path in response to satisfying the second preset condition;

determining whether a memory compression utilization rate reaches a preset utilization rate threshold in response to not satisfying the second preset condition;

reporting the process shutdown event based on the memory pressure in response to the memory compression utilization rate reaching the preset utilization rate threshold;

determining whether an available memory is less than a preset available threshold in response to the memory compression utilization rate not reaching the preset utilization rate threshold;

reporting the process shutdown event based on the memory pressure in response to the available memory being less than the preset available threshold, and continuing monitoring the memory pressure on the memory reclaim path in response to the available memory exceeding the preset available threshold.

12. The method of claim 10, wherein, the kernel layer further comprises a memory reclaimer; the memory reclaimer communicates with the service component; the method further comprises:

calling by the service component the memory reclaimer in response to receiving at least one of (a) a charging signal and (b) a screen locking signal, and providing by the memory reclaimer an active reclaim for anonymous page memory of a process in a user mode.

13. The method of claim 12, wherein, the method further comprises:

stopping by the service component calling the memory reclaimer to stop the active reclaim in response to receiving at least one of a power disconnection signal and a screen lightening signal.

14. The method of claim 10, wherein, the framework layer further comprises a system pressure controller; the system pressure controller communicates the service component; the method further comprises:

sending by the service component a first notification message to the system pressure controller in response to the memory event being a process shutdown event; and shutting down by the system pressure controller a process based on an active degree of the process in response to the first notification message.

15. The method of claim 10, wherein, the activity management service component further communicates with a system pressure controller in the framework layer; the method further comprises:
sending by the activity management service component a second notification message to the system pressure controller in response to detecting that a target application currently running is moved to the background; and
shutting down by the system pressure controller a target application occupying a memory exceeding a preset occupancy threshold in response to receiving a second notification message.

16. A non-transitory computer readable storage medium, wherein, an executable computer program in the storage medium, when performed by a processor, is caused to achieve a memory management method for an operating system, applied to a memory management system based on an operating system, the operating system comprises a framework layer, a native layer and a kernel layer; the memory management system comprises a service component on the framework layer, a memory manager on the native layer and an interface reclaimer on the kernel layer; the service component communicates with the memory manager and the interface reclaimer, respectively; the method comprises:

determining a memory event, by the memory manager, based on pressure stall information (PSI) obtained from a hook on a memory reclaim path, and reporting the memory event to the service component; and
calling by the service component the interface reclaimer in response to the memory event being an event of reclaiming memory based on a process, and shutting down a corresponding process interface by the interface reclaimer;
wherein, the framework layer further comprises an activity management service component; the activity management service component communicates with the interface reclaimer;
the activity management service component is configured to call the interface reclaimer in response to detecting that an application is moved to a background and shut down the corresponding process interface by the interface reclaimer;
wherein, the activity management service component further communicates with the memory reclaimer in the kernel layer;
the activity management service component is configured to call the memory reclaimer in response to detecting switching from the application to a desktop and provide by the memory reclaimer an active reclaim for anonymous page memory of a process in a user mode.

* * * * *